US010601672B2

(12) United States Patent
Jeuk et al.

(10) Patent No.: US 10,601,672 B2
(45) Date of Patent: Mar. 24, 2020

(54) INTER-TENANT WORKLOAD PERFORMANCE CORRELATION AND RECOMMENDATION

(71) Applicant: Cisco Technology, Inc., San Jose, CA (US)

(72) Inventors: Sebastian Jeuk, San Jose, CA (US); Gonzalo Salgueiro, Raleigh, CA (US); Ralf Rantzau, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 179 days.

(21) Appl. No.: 15/791,587

(22) Filed: Oct. 24, 2017

(65) Prior Publication Data

US 2019/0123973 A1     Apr. 25, 2019

(51) Int. Cl.
*G06F 15/173*     (2006.01)
*H04L 12/24*     (2006.01)
(Continued)

(52) U.S. Cl.
CPC ........ *H04L 41/145* (2013.01); *G06F 9/5027* (2013.01); *G06F 9/5072* (2013.01);
(Continued)

(58) Field of Classification Search
CPC ............... H04L 41/145; H04L 41/5019; H04L 41/5032; H04L 67/10; G06N 20/00; G06N 5/047; G06F 9/5027; G06F 9/5072
(Continued)

(56) References Cited

U.S. PATENT DOCUMENTS

2013/0232254 A1*  9/2013  Srikanth ............ H04L 43/0876
                                                                709/224
2014/0280946 A1    9/2014  Mukherjee et al.
(Continued)

FOREIGN PATENT DOCUMENTS

EP           2615803         7/2013
WO    WO 2015/164023    10/2015

OTHER PUBLICATIONS

International Search Report and Written Opinion from the International Searching Authority, dated Feb. 14, 2019, 13 pages, for corresponding International Patent Application No. PCT/US18/57249.

*Primary Examiner* — Wing F Chan
*Assistant Examiner* — Joseph R Maniwang
(74) *Attorney, Agent, or Firm* — Polsinelli PC

(57) ABSTRACT

The present disclosure involves systems and methods for obtaining and correlating workload performance information from multiple tenants on a computing network and providing deployment improvement suggestions to a cloud operator or tenant based at least on the correlated workload performance information. In one particular implementation, applications deployed and executed on the cloud environment may provide performance logs and/or metrics to an inter-tenant workload engine of the cloud environment. The workload engine may utilize the received performance information to detect performance patterns of an application across the different tenant deployments. A recommendation engine may analyze the performance characteristics across the multiple tenant applications and determine an optimized deployment of the application and generate recommended deployment instructions to a cloud environment administrator and/or one or more tenants of the cloud environment.

19 Claims, 8 Drawing Sheets

(51) Int. Cl.
   *G06N 5/04* (2006.01)
   *G06N 20/00* (2019.01)
   *G06F 9/50* (2006.01)
   *H04L 29/08* (2006.01)

(52) U.S. Cl.
   CPC ............ *G06N 5/047* (2013.01); *G06N 20/00* (2019.01); *H04L 41/5019* (2013.01); *H04L 41/5032* (2013.01); *H04L 67/10* (2013.01)

(58) Field of Classification Search
   USPC .......................................................... 709/224
   See application file for complete search history.

(56) References Cited

U.S. PATENT DOCUMENTS

| | | | |
|---|---|---|---|
| 2015/0244596 A1* | 8/2015 | Abuelsaad | H04L 67/10 709/224 |
| 2017/0024396 A1* | 1/2017 | Adarsh | G06Q 10/04 |

* cited by examiner

INTER-TENANT WORKLOAD PERFORMANCE CORRELATION AND RECOMMENDATION

TECHNICAL FIELD

The present disclosure relates generally to the field of computing, and more specifically, to obtaining and correlating workload performance information from multiple tenants on a computing network and providing deployment recommendations based at least on the correlated workload performance information.

BACKGROUND

Many computing environments or infrastructures provide for shared access to pools of configurable resources (such as compute services, storage, applications, networking devices, etc.) over a communications network. One type of such a computing environment may be referred to as a cloud computing environment. Cloud computing environments allow users, and enterprises, with various computing capabilities to store and process data in either a privately owned cloud or on a publicly available cloud in order to make data accessing mechanisms more efficient and reliable. Through the cloud environments, software applications or services may be distributed across the various cloud resources in a manner that improves the accessibility and use of such applications and services for users of the cloud environments.

Operators of cloud computing environments often host many different applications from many different tenants or clients. For example, a first tenant may utilize the cloud environment and the underlying resources and/or devices for data hosting while another client may utilize the cloud resources for networking functions. In general, each client may configure the cloud environment for their specific application needs. However, applications are often deployed in the cloud environment with either too many resources used or too little. In other words, cloud computing clients tend to define their own application deployment (i.e., which resources are requested how many such resources are needed, and/or how those resources are interconnected) within the available cloud environment. In either case, client application deployment may not be optimized for the available cloud resources such that performance of the deployed application suffers.

BRIEF DESCRIPTION OF THE DRAWINGS

The above-recited and other advantages and features of the disclosure will become apparent by reference to specific embodiments thereof which are illustrated in the appended drawings. Understanding that these drawings depict only example embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
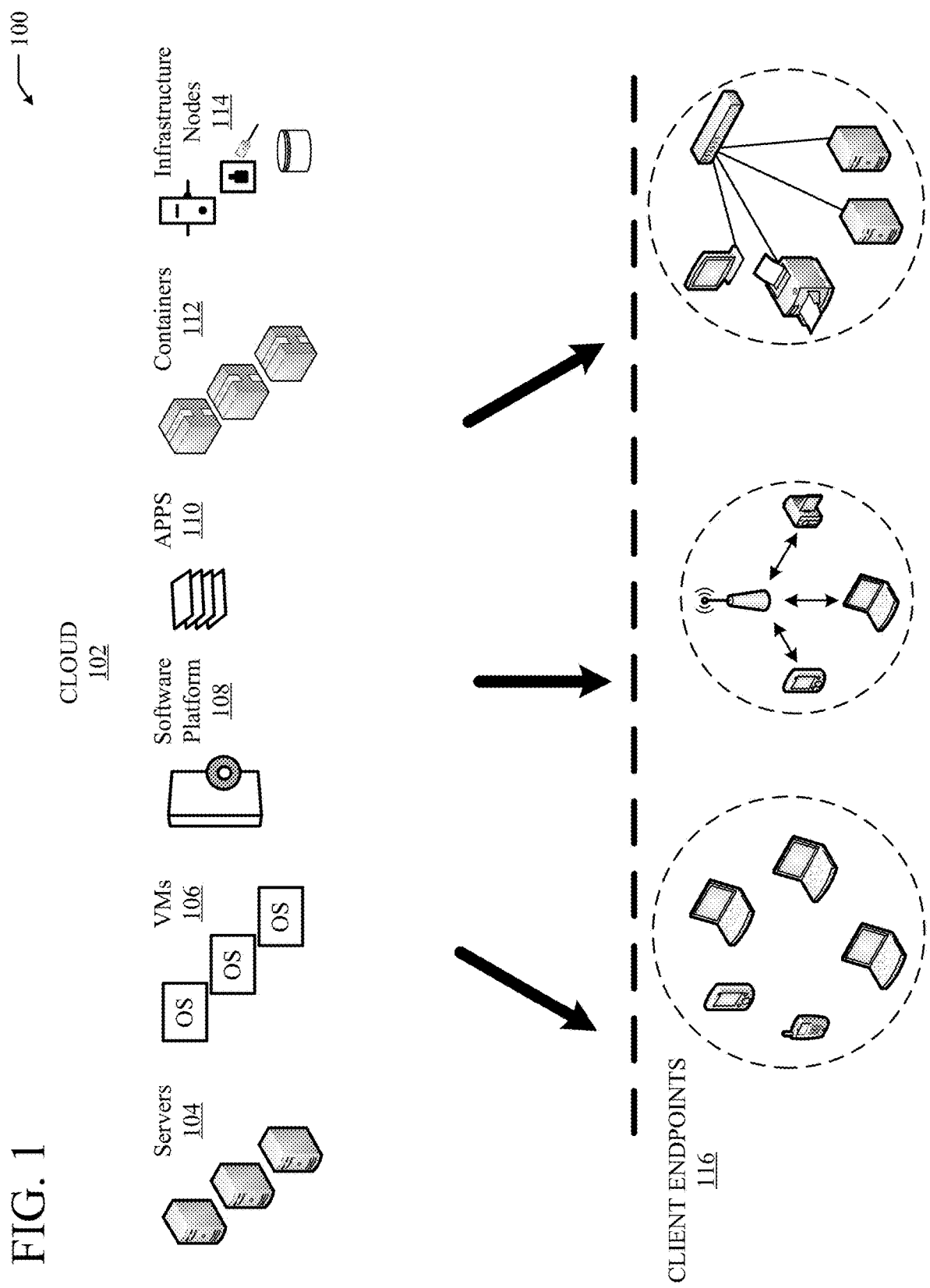
FIG. 1 is a system diagram of an example cloud computing architecture.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview:

A system, network device, method, and computer readable storage medium is disclosed for deployment of a workload on a computing environment. The system may include a workload analysis engine of a cloud computing operator in communication with a first tenant space on the cloud computing environment and a second tenant space on the cloud computing environment. The workload analysis engine may receive a first set of log entries and metric information from the first tenant space generated from a first executed workload and create a first performance pattern from the first set of log entries and metric information corresponding to the first executed workload. The workload analysis engine may also receive a second set of log entries and metric information from the second tenant space generated from a second executed workload and create a second performance pattern from the second set of log entries and metric information corresponding to the second executed workload.

The system may further include a recommendation engine in communication with the workload analysis engine to receive the first performance pattern and the second performance pattern, the recommendation engine. The recommendation engine may then associate the first performance pattern and the second performance pattern as generated from the same type of workload deployment on the cloud computing environment and generate at least one deployment recommendation for a deployment of the second executed workload deployed on the cloud computing environment by the second tenant space, the at least one deployment recommendation correlated to a deployment of the first executed workload in the first tenant space.

The recommendation engine may also obtain metadata of the second tenant space of the computing environment comprising one or more constraints on deployment of workloads on the second tenant space of the computing environment, such as a service level agreement between a second tenant operator and a computing environment, operator. The at least one recommendation may be executed on the second tenant space of the computing environment such that the at least one deployment recommendation alters the deployment of the second executed workload in the second tenant space. Further, executing the at least one deployment recommendation may be based at least, on the metadata of the second tenant space of the computing environment.

EXAMPLE EMBODIMENTS

Aspects of the present disclosure involve systems and methods for obtaining and correlating workload performance information from multiple tenants on a computing network and providing deployment improvement suggestions to a cloud operator or tenant based at least on the correlated workload performance information. In one particular implementation, applications (or portions of applications) deployed and executed on the cloud environment may provide performance logs and/or metrics to an inter-tenant workload engine of the cloud environment. The workload engine may utilize the received performance information and one or more machine learning approaches to detect performance patterns of an application across the different tenant deployments. In other words, the engine may identify a performance characteristic or pattern that may indicate the execution of a similar application by different cloud environment tenants. Once a similar application is identified as executed or deployed by different tenants on the cloud environment, the workload engine may determine a relative performance characteristic of each application. For example, a shorter duration to accomplish or execute the application may be determined and compared between the two executing applications. Other performance characteristics may also be determined or gathered, such as an amount of resources utilized (CPU usage, storage capacity, etc.) and/or resource usage efficiency (relative queue size, latency, data loss, etc.) may also be used. In general, any performance characteristic may be determined by the workload engine for comparison with other similarly executing applications.

In addition, the correlated workload performance information from multiple tenants on the computing network may be provided to a recommendation engine of the cloud environment. The recommendation engine may analyze the performance characteristics across the multiple tenant applications and determine a "best fit" or optimized deployment of the application. The optimized deployment may or may not include particular policies of the application deployment, such as service level agreements, limitations on resource consumption, cost, etc., in general, the recommendation engine generates an optimized deployment for any iteration or type of application deployed on the cloud environment with any number of policies associated with the optimized deployment.

Once an optimized deployment is generated, the recommendation engine may provide such deployment to a cloud environment administrator and/or one or more tenants of the cloud environment. The optimized deployment may provide a suggested improvement to the deployed application of the tenant or the cloud administrator. In one implementation, the optimized deployment is provided to a recommendation engine that is deployed within the tenant space of the cloud environment. The tenant recommendation engine may then determine if the recommended deployment for the application should or should not be executed on the tenant's space of the cloud environment. For example, the tenant recommendation engine may consider one or more service level agreements or other inputs to determine if the suggested deployment of the application is to be accepted and applied. In another example, the tenant recommendation engine may determine a cost for the suggested application deployment and the possible cost savings to the tenant and compare that cost with a cost threshold for the tenant. If the optimized recommendation is to be deployed as determined by the tenant recommendation engine, the tenant engine may deploy at least a portion of the recommend workload on the cloud environment through one or more deployment services of the client cloud space. In this manner, the cloud environment may obtain and correlate workload performance information from multiple tenants on a computing network and provide one or more deployment recommendations to tenants of the cloud environment based at least on the correlated workload performance information.

In a similar manner, the systems and methods described herein may provide the optimized application deployment to a cloud administrator or administration system. The cloud administration system may then analyze one or more of the similar applications deployed on the environment, and may decide to deploy at least a portion of the optimized and recommended application deployment received from the recommendation engine. Similar to above, the administration system may determine one or more service level agreements or policies of the deployed applications to determine if the recommended application deployment is applied to the cloud environment.

Beginning with the system of FIG. 1, a diagram of an example cloud computing architecture 100 is illustrated. The architecture can include a cloud computing environment 102. The cloud 102 may include one or more private clouds, public clouds, and/or hybrid clouds. Moreover, the cloud 102 may include any number and type of cloud elements 104-114, such as servers 104, virtual machines (VMs) 106, one or more software platforms 108, applications or services 110, software containers 112, and infrastructure nodes 114. The infrastructure nodes 114 can include various types of nodes, such as compute nodes, storage nodes, network nodes, management systems, etc.

The cloud 102 may provide various cloud computing services via the cloud elements 104-114 to one or more clients 116 of the cloud environment. For example, the cloud environment 102 may provide software as a service (SaaS) (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), function as a service (FaaS), and other types of services such as desktop as a service (DaaS), information technology management as a service (ITaaS), managed software as a service (MSaaS), mobile backend as a service (MBaaS), etc.

Client endpoints 116 connect with the cloud 102 to obtain one or more specific services from the cloud 102. For example, the client endpoints 116 communicate with elements 104-114 via one or more public networks (e.g., Internet), private networks, and/or hybrid networks (e.g., virtual private network). The client endpoints 116 can include any device with networking capabilities, such as a laptop computer, a tablet computer, a server, a desktop computer, a smartphone, a network device (an access point, a router, a switch, etc.), a smart television, a smart car, a sensor, a GPS device, a game system, a smart wearable object (e.g., smartwatch, etc.), a consumer object (e.g., Internet refrigerator, smart lighting system, etc.), a city or transportation system (e.g., traffic control, toll collection system, etc.), an internet of things IoT) device, a camera, a network printer, a transportation system (e.g., airplane, train, motorcycle, boat, etc.), or any smart or connected object (e.g., smart home, smart building, smart retail, smart glasses, etc.), and so forth.

Figure 2:
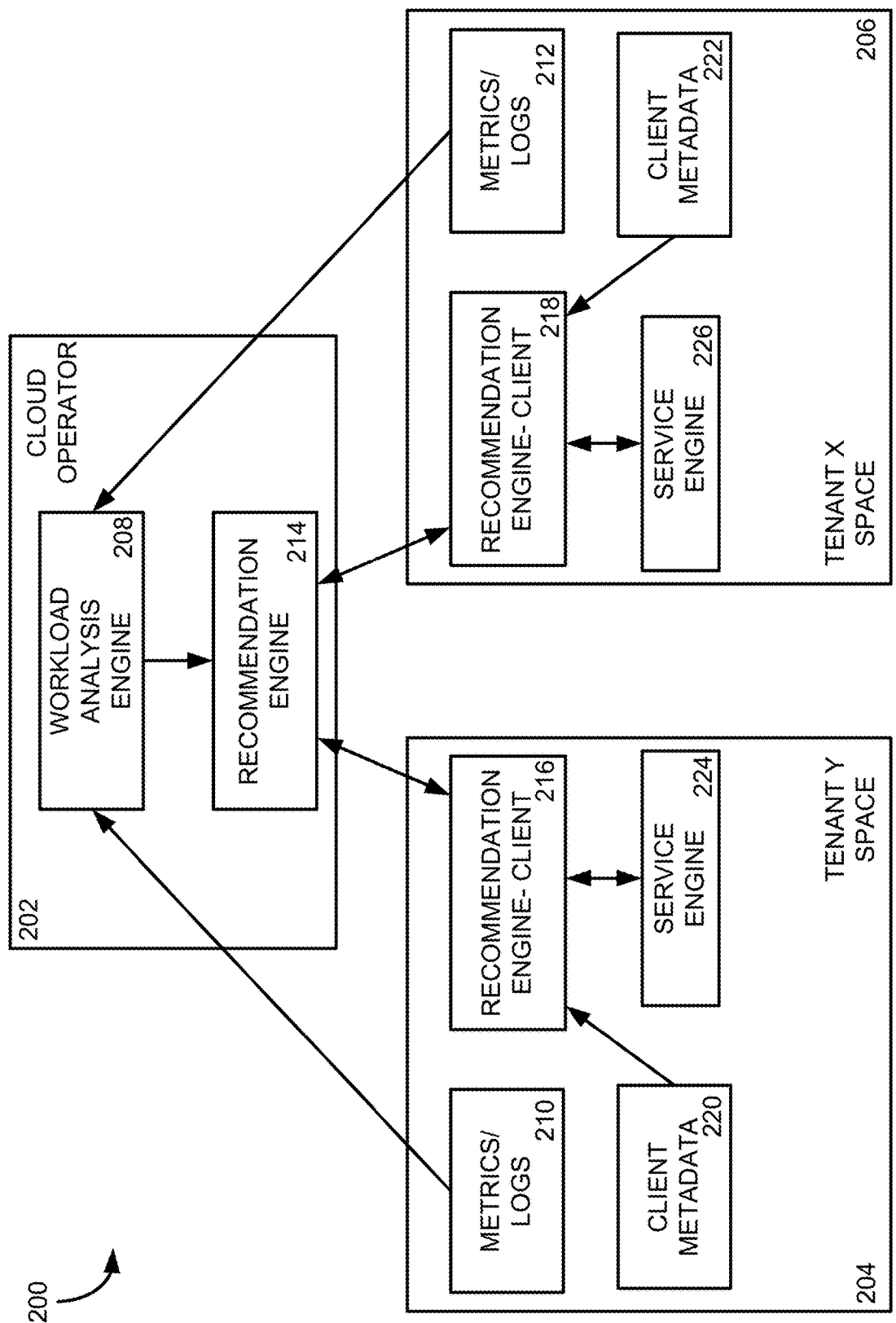
FIG. 2 is a system diagram for an inter-tenant workload performance correlation and recommendation system on a multi-tenant computing environment.

As mentioned above, the cloud environment 102 may include, in some implementations, a system for obtaining and correlating workload performance information from multiple tenants on a computing network and providing deployment recommendations based at least on the correlated workload performance information. In particular, FIG. 2 is a system diagram for all inter-tenant workload performance correlation and recommendation system 200 on a multi-tenant computing environment. In general, the inter-tenant workload performance correlation and recommendation system 200 includes components for a cloud operator or administrator 202 and one or more tenant spaces 204, 206 within the cloud environment. However, it should be appreciated that one or more of the components of the system 200 of FIG. 2 may be included in computing environments other than the particular cloud computing environment. For example, cloud operator 202 may or may not be included in the cloud computing environment utilized by tenant space Y 204 and tenant space X 204. Through the system 200, however, performance of applications executed or distributed in tenant space Y 204 and tenant space X 206 may be analyzed and correlated to provide a recommended or optimized application deployment to the tenants.

As shown, the cloud operator environment 202 (which may be included in a cloud environment or may be in communication with the cloud environment) may include a workload analysis engine 208 component. In general, the workload analysis engine 208 is a system that analyzes the performance and associated patterns of applications run or executed by different tenants 204, 206 of the cloud environment 102. As explained above, tenants 204, 206 of the cloud environment may be allocated a subset of available resources of a cloud environment 102 to execute one or more applications.

In one implementation, the available resources utilized by the tenants 204, 206 of the cloud environment 102 may provide performance information to a workload analysis engine 208 of the cloud operator environment 202. Performance information provided to the workload analysis engine 208 may include, but is not limited to, performance logs and/or performance metrics of an executed application. For example, performance logs may include a sequence of log entries provided by resources of the cloud environment that are utilized by an executing application. In one implementation illustrated in FIG. 2, tenant space Y 204 may include resources of the cloud environment that are utilized to execute one or more applications of tenant Y. One or more of the resources consumed or utilized by the applications of tenant Y may provide log or other performance information 210 to the workload analysis engine 208 of the system 200. Similarly, one or more of the resources consumed or used by the applications of tenant X may provide log, or other performance information 212 to the workload analysis engine 208 of the system 200. Tenant Y 204 and Tenant X 206 may be different clients of the cloud environment or otherwise occupy different spaces or resources within the cloud environment 102. The respective log information for each client or tenant may include one or more benchmarks or completed portions of a deployed application that indicate an executed state of the application. Similarly, one or more of the resources utilized by the tenants 204, 206 of the cloud environment 102 may provide performance metric information to the workload analysis engine 208 of the system 200. Such metric information may include any type of resource utilization or performance measurement, including but not limited to, usages of CPU resources, memory resources, input/output (110) resources, network resources, etc. of the cloud computing environment 102, and the like.

Figure 3:
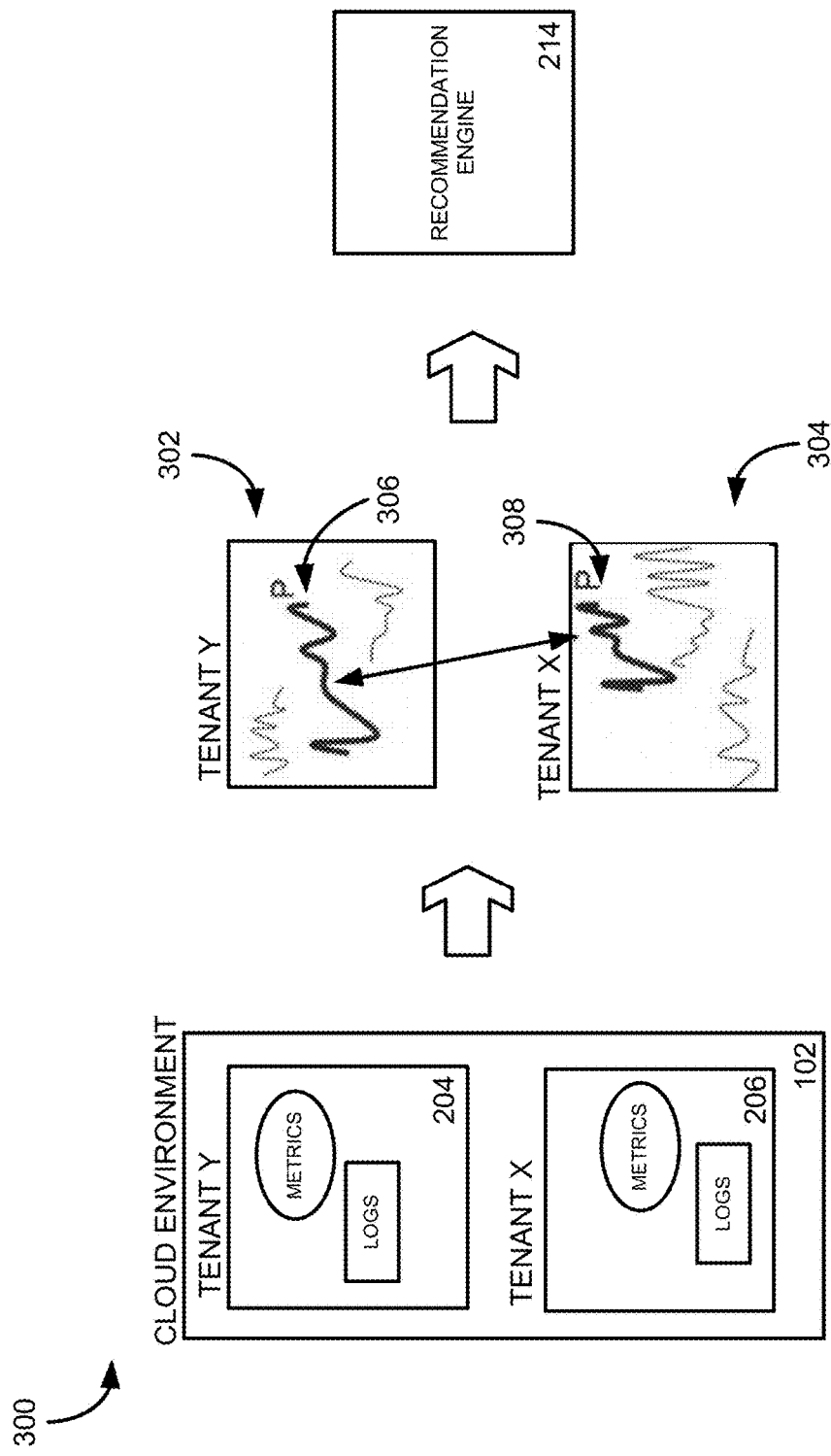
FIG. 3 is a diagram illustrating performance pattern recognition and correlation of workloads executed on a computing environment by multiple tenants.
Figure 4:
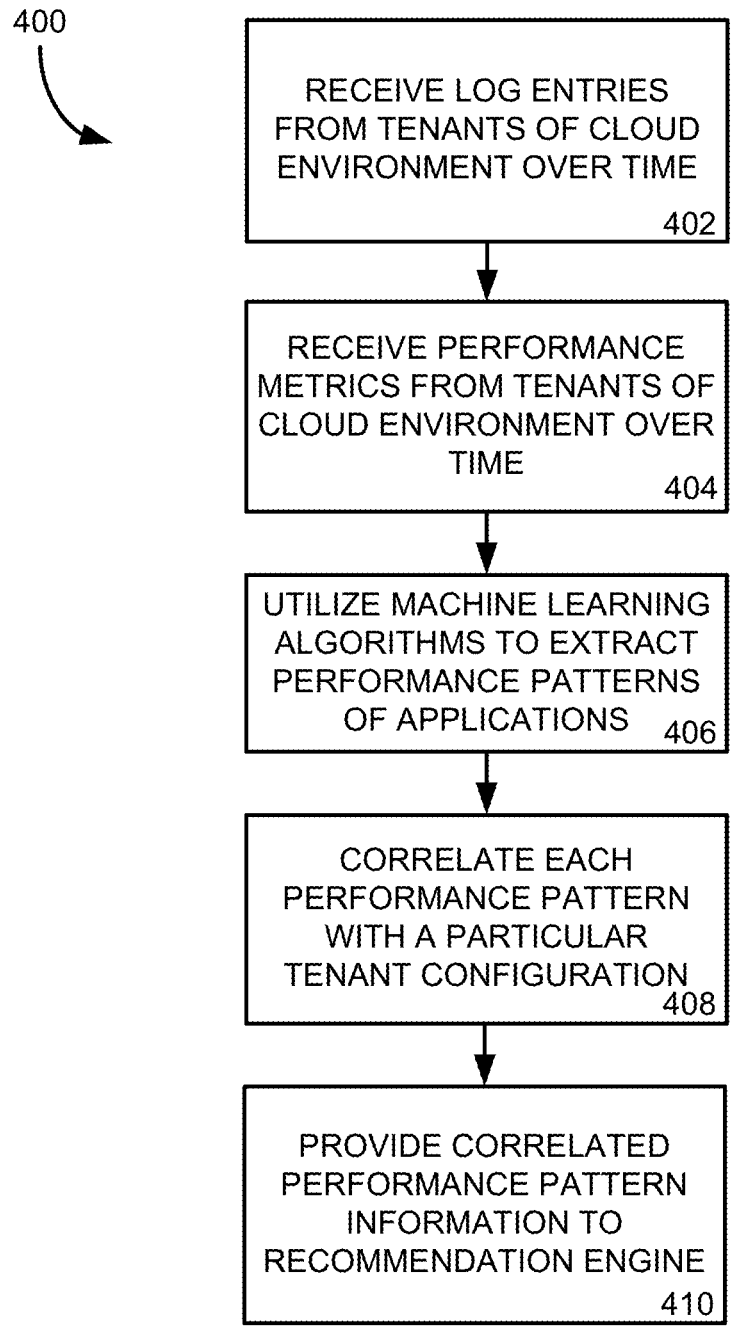
FIG. 4 is a flowchart of a method for correlating workloads executed on a computing environment by multiple tenants.

In general, the workload analysis engine 208 of the cloud environment 202 or cloud operator may analyze the performance information received from the tenants 204, 206 of the cloud environment to identify performance patterns of the executing applications and/or correlate performance patterns across tenant configurations of the cloud. In particular, FIG. 3 is a diagram 300 illustrating performance pattern recognition and correlation of workloads executed on a computing environment 102 by multiple tenants 204, 206. Further, FIG. 4 illustrates a flowchart of a method 400 for correlating workloads executed on a computing environment by multiple tenants. The operation of the workload analysis engine 208 is discussed below with reference to both FIG. 3 and FIG. 4.

Included in FIG. 3 is a cloud computing environment 102 that hosts multiple tenants, illustrated as tenant Y 204 and tenant X 206. As discussed above, each tenant 204, 206 of the cloud environment 102 may occupy or utilize resources within the cloud environment, referred to as the tenant space within the environment. In some instances, the tenants 204, 206 may share one or more physical devices of the cloud 102, but are maintained in separate virtual spaces within the environment. Each tenant may deploy and execute applications within the tenant space and, as a result of the application execution, performance logs and/or performance metrics may be generated. In general, performance logs provide information on sequences of events related to the applications of the tenant while performance metrics provide measurements of utilization of cloud resources by the executing applications.

Turning now to the method 400 of FIG. 4, the operations described may be executed by the workload analysis engine 208 of the cloud environment 102 or cloud operator 202. The workload analysis engine 208 may include one or more computing devices for performing the operations described including one or more hardware circuits, software programs, or combination of hardware and software components.

Beginning in operation 402, the workload analysis engine 208 receives the log entries from one or more tenants of the cloud computing environment over a period of execution time. For example, tenant Y 204 may execute one or more applications in the tenant Y space of the cloud environment. The performance logs (listing a sequence of events for a particular application) may be transmitted to the workload analysis engine 208 by tenant Y 204 or the cloud environment 102. Similarly, tenant X 206 may execute one or more applications that may be the same or different than tenant Y applications) in the tenant X space 206 of the cloud environment 102. It should be appreciated that the deployment of similar applications may be different between the two tenants. For Example, tenant Y 204 may deploy a networking application that utilizes four networking devices while tenant X 206 may deploy a similar networking application that utilizes only two networking devices. Other policy considerations of the cloud environment 102 and/or the tenants 204, 206 may also be considered when deploying an application. Similar to above, performance logs (listing a sequence of events for a particular application) associated with the tenant X applications may be transmitted to the workload analysis engine 208 by tenant X 206 or the cloud environment 102 during or after application execution.

In operation 404, the workload analysis engine 208 receives the performance metrics from the one or more tenants 204, 206 of the cloud computing environment 102 over the period of execution time. For example, the applications executed by tenant Y 204 and/or tenant X 206 generate performance metrics that are measured by the cloud environment 102 or respective tenant space. These performance metrics may include any type of measurable performance characteristics of the resources utilized by the executing applications, such as CPU usage, memory consumption, input/output (I/O) measurements, network, transmission speed, and the like. These performance metrics are transmitted to the workload analysis engine 208 for analysis and processing as described in more detail below.

With the received information (logs and metrics) from the various executing applications, the workload analysis engine 208 may begin generating performance patterns or signatures of the applications as executed on the tenant spaces in operation 406. In particular, one or more machine learning algorithms may lie employed that take as input the performance logs and metrics for an application and create a particular performance signature or pattern defined by the information. These performance patterns may be learned over the time period in which the information is received. Further, the workload analysis engine 208 may tune particular application performance patterns as more and more information is received. For example, a particular application may cause the workload analysis engine 208 to generate a first application performance pattern. However, as the application is executed multiple times on the tenant space. The performance pattern for the application may be altered to account for additional performance information.

In general, a pattern may be characterized by a sequence S of events from received performance logs and/or a sequence S of values from received performance metrics for each application or workload executed on a tenant space. In other words, a pattern may be defined as a topic P=(S, A). Such patterns occur when a tenant T runs the application A in an environment of resources R. Such an occurrence/instance of a pattern P may be referred to as a "performance pattern" p, such that p can be characterized by a duration d of S for tenant T using resources R: p=(P, d(S), R, T). To determine or create a performance pattern of a workload, the workload analysis engine 208 may utilize any type of machine learning algorithm, either known or hereafter developed.

The generation of a performance pattern is illustrated in FIG. 3 through box 302 and box 304. In particular, box 302 visually illustrates a performance pattern for three applications or workloads executed by tenant Y 204 and box 304 visually illustrates a performance pattern for three applications or workloads executed by tenant X 206. However, it should be appreciated that performance patterns may not take the form of a graph or other visual "signature". Rather, the performance patterns generated by the workload analysis engine 208 may include changes in performance metrics, through-put of critical activities, response-time for critical activities, particular sequences of events, and the like. The visual representation of the performance patterns of the tenants 204, 206 of the cloud environment 102 are provided in FIG. 3 for simplicity and ease of understanding.

In operation 408, the workload analysis engine 208 may correlate each performance pattern generated for each tenant to a particular tenant configuration or deployment. In other words, each workload or application for a tenant of the cloud environment may utilize particular resources of the environment to execute. For example, a data management application may utilize one or more storage devices, one or more CPUs, and one or more I/O resources of the cloud environment. Thus, the workload analysis engine 208 may correlate an identified performance pattern with a particular configuration of cloud resources. This information may also be correlated to one or more performance measurements for the workload or application. For example, once a workload is identified as utilizing a particular resource or device, the metrics and/or logs from that particular device may be obtained and correlated to the identified workload. In still other examples, the workload analysis engine 208 may correlate generic performance measurements with identified workloads, such as time for completion, overall CPU consumption, memory storage, and the like. In this implementation, the workload analysis engine 208 may not have specific information about the deployment of the workload, but may obtain particular performance metrics of the workload from the logs and/o metrics obtained as described above. In general, the workload analysis engine 208 may correlate any aspect of the deployment of the workload on the cloud environment to an identified performance pattern for the tenants of the cloud.

In operation 410, the correlated performance pattern information and data may be provided to a recommendation engine 214 of the cloud operator 202. As explained in more detail below, the recommendation engine 214 may analyze the received information from the workload analysis engine 208 (including identified performance patterns, correlated performance measurements of the identified patterns, information about tenants executing the identified patterns, information or identification of tenants operating similar workloads, etc.). Through this analysis, the recommendation engine 214 may provide a recommendation to one or more tenants (or to the cloud environment itself) for improving the execution or deployment of workloads on the environment.

As illustrated in the diagram 300 of FIG. 3, tenant Y 204 executes various workloads or applications, illustrated as the performance patterns of diagram 302. Similarly, tenant X 206 executes other various workloads or applications, illustrated as the performance patterns of diagram 304. In some instances, the tenants 204, 206 may execute similar applications or workloads that provide similar performance patterns. For example, tenant Y 204 may execute a workload that creates performance pattern 306 while tenant X 206 may execute a workload that creates performance pattern 308. These performance patterns, along with other information, may be transmitted to a recommendation engine 214. As described in more detail below, the recommendation engine 214 may identify similar performance patterns of different tenants 204, 206 of the cloud environment 102 to provide a recommendation for improvement to a deployment of the workload in the respective tenant space.

Figure 5:
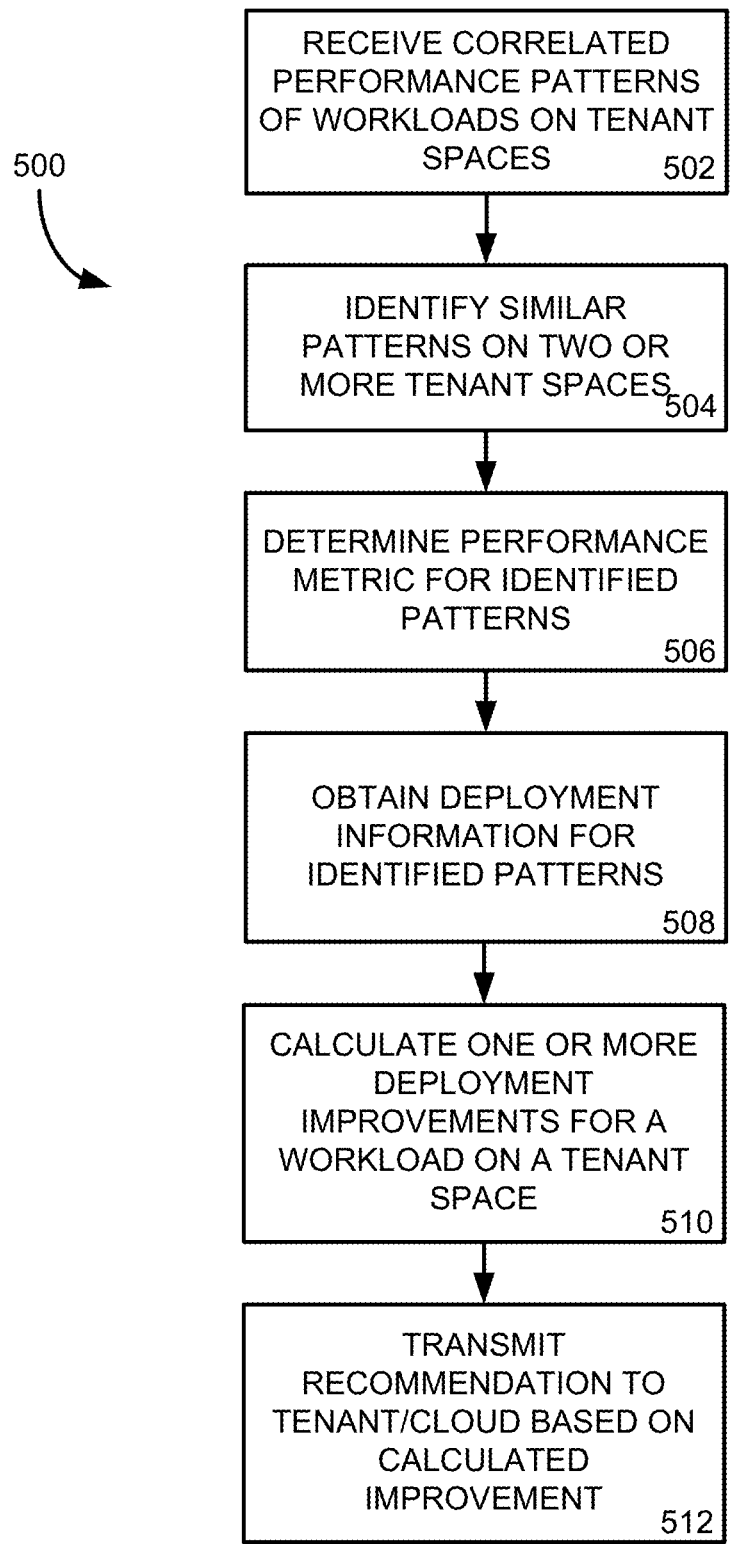
FIG. 5 is a flowchart of a method for generating a recommendation for a workload executed on a computing environment based on correlated workloads from multiple tenants of the environment.

FIG. 5 is a flowchart of a method 500 for generating a recommendation for a workload executed on a computing environment 102 based on correlated workloads from multiple tenants of the environment. In one embodiment, the operations of the method 500 may be performed or executed by the recommendation engine or server 214 of the cloud operator 202 of FIG. 2. In general, however, any number of computing devices in communication with the workload analysis engine 208 discussed above may perform one or more of the operations described.

Beginning in operation 502, the recommendation engine 214 receives correlated performance patterns of workloads executed or otherwise deployed on tenant spaces 204, 206 of the cloud environment 102. With the received correlated performance patterns, the recommendation engine 214 may identify similar patterns between two or more tenants 204, 206 of the cloud environment 102. For example and as described above with reference to FIG. 3, tenant. Y 204 may execute a workload that creates performance pattern 306 while tenant X 206 may execute a workload that creates performance pattern 308. The recommendation engine 214 may analyze these patterns and determine that performance pattern 306 and performance pattern 308 are similar enough to suggest that tenant Y 204 and tenant X 206 are executing similar workloads or applications. In one particular embodiment, a machine learning algorithm, such as a dynamic time warping (DTW) algorithm may extrapolating a certain signature or performance pattern P1 over time interval I1 captured by the first component to another signature/pattern P2 over time interval I2. In other words, although one performance pattern P1 may be executed over a shorter or longer time period that performance pattern. P2, the recommendation engine 214 may still identify similar patterns (of events from received logs or performance measurements from received metrics) between two or more tenants of the cloud environment 102. In many implementations, the recommendation engine 214 may determine similarly executed workloads across tenants 204, 206 without having direct knowledge of the types of applications being executed or the particular characteristics of the deployment in the respective tenant space. In this manner, the cloud operator 202 may maintain a separation between the tenant spaces 204, 206 while potentially providing suggested improvements to workload deployment from intra-tenant performance analysis.

In operation 506, the recommendation engine 102 determines or correlates at least one performance metric for the identified similar performance patterns on the tenant spaces 204, 206. For example, a pattern may be identified as equal/similar (P) although the duration of the pattern occurrences can be different in different tenant spaces 204, 206. This allows the recommendation engine 214 to draw conclusions about each application's "performance", where higher performance may correlate to shorter interval of pattern occurrence. For example, assume a tenant Y 204 uses a set of resources R1 for application A1 and exhibits a pattern P 306, executing in interval I1. Also assume that tenant X 206 executes application A2 using a set of resources R2 provides the same or similar pattern P 308, hut takes more time (I2) to execute. In this example, the recommendation engine 214 may determine that the deployment of application A1 on resources R1 is an improvement or higher performing than the deployment of application A2 on resources R2.

Although the example above utilizes time to execute as a performance metric for the similar performance patterns, it should be appreciated that any performance metric may be utilized to compare similar patterns. For example, the recommendation engine 214 may determine a CPU usage metric for the similar patterns to determine a higher performing deployment. In another example, the recommendation engine 214 may utilize another metric, such as a network transmission speed, memory consumed, number of utilized resources or devices of the cloud, etc. In still other examples, the recommendation engine 214 may consider several performance metrics when determining a higher performing application or workload deployment of similar performance patterns.

In operation 508, the recommendation engine 214 may receive or obtains deployment information for the workloads or applications related to the identified performance patterns. Utilizing the example above, the recommendation engine 214 may determine the resources of the cloud environment 102 for tenant space R1 and tenant space R2 for the deployment of the similar applications A1 and A2. Such deployment information may be any type of information related to the deployment of the applications or workloads, including but not limited to, devices utilized, physical and/or virtual location of resources, whether resources are shared or dedicated, particular standards or protocols utilized, etc.

In operation 510, the recommendation engine 214 determines or calculates one or more deployment improvements for a workload on a tenant space 204, 206 of the cloud environment 102. Again utilizing the example above, the recommendation engine 214 may conclude that application A2 on resources R2 may be improved if the deployment of A2 was similar to the deployment of application A1 on resources R1. In other words, if application A2 is configured with the same or similar set of resources as A1, A2 has the potential to perform better (i.e. In this example, execute faster). In another example, the recommendation engine 214 may determine that a higher performing application utilizes twice as many CPUs as a similar application or workload, with all other resources being the same or similar. In this example, the recommendation engine 214 may create a recommendation for deployment of the lower-performing application to double the number of CPUs utilized. In that particular application deployment. In general, the recommendation provided by the engine 214 may include any suggestion related to the deployment of an application or workload to improve the performance of the application.

In some embodiments and illustrated as operation 512, the recommendation engine 214 may provide a recommendation for deployment improvement to a, tenant-specific recommendation engine 216, 218. For example, tenant 1204 may include a client recommendation engine 216 within the tenant Y space (or otherwise in communication with the tenant space). Similarly, tenant X 206 may include a client recommendation engine 218 within the tenant X space. In some instances, the tenants 204, 206 of the cloud environment 102 may share a client recommendation engine. In other implementations, the system 200 may not utilize any client recommendation engines 216, 218 but rather utilizes the recommendation engine 214 of the cloud operator 202 to perform each of the operations described herein.

In the embodiments where a client recommendation engine 216, 218 is utilized, the recommendation engine server 214 of the cloud operator 202 may utilize one or more. Application Programming Interfaces (APIs) to communicate with the client recommendation engine for each affected tenant 204, 206. In other words, if the recommendation engine server 214 is providing a recommendation to tenant Y 204, the recommendation engine server may access a particular API to communicate with the tenant Y space. If the recommendation engine server 214 is providing a recommendation to tenant X 206, the recommendation engine server may access a different API to communicate with the tenant X space. Regardless of the implementation used, recommendations developed by the recommendation engine 214 may be provided to one or more client recommendation engines for deployment.

Figure 6:
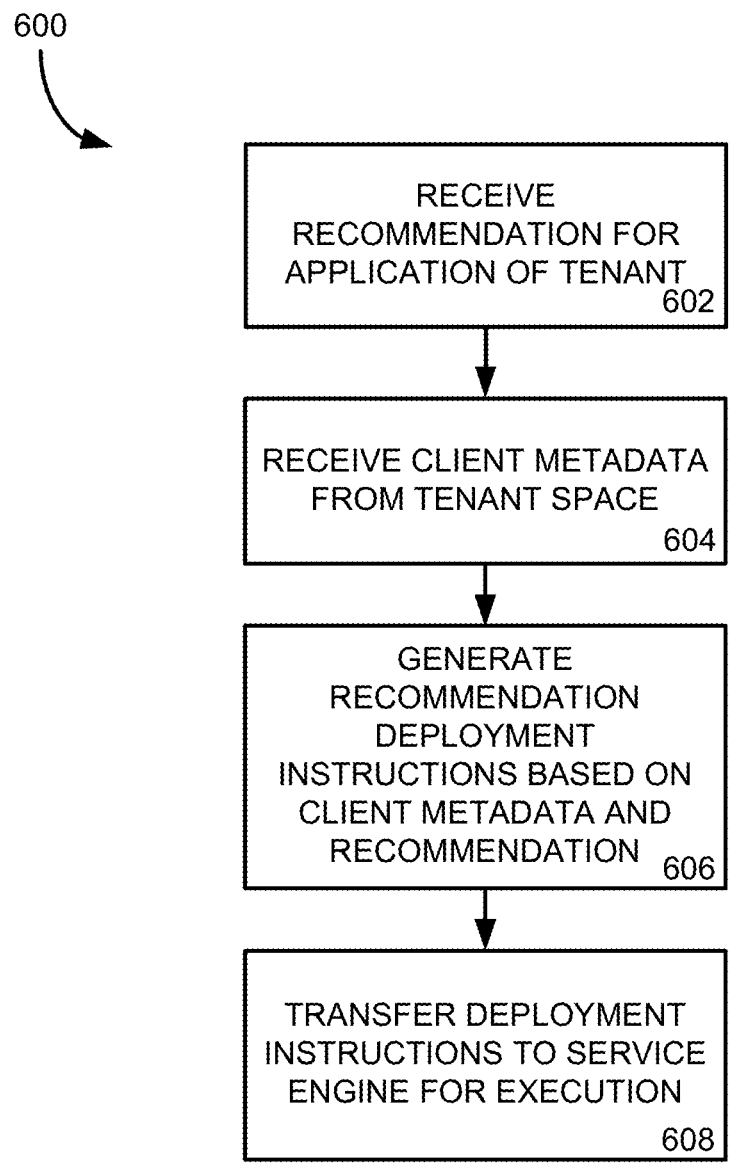
FIG. 6 is a flowchart of a method for implementing a received recommendation for a distributed workload executed on a computing environment.

FIG. 6 is a flowchart of a method 600 for implementing a received recommendation for a distributed workload executed on a computing environment. In general, the operations of the method 600 may be performed by the recommendation engine 214 of the cloud operator 202 discussed above or a client recommendation engine 216 of a tenant space 204, 206 of the cloud environment 102. Beginning in operation 602, the client recommendation engine 216, 218 receives one or more recommendations for improving the performance of an application or workload executed by the particular client. For example, recommendation engine 214 (as explained above with reference to FIG. 5) may determine one or more recommendations to improve the deployment or execution of an application (A1) on tenant space Y 204. The recommendation engine 214 may thus transmit such a recommendation to client recommendation engine 216 associated with tenant Y 204. Such a recommendation may be based at least on a comparison of a performance pattern of A2 as analyzed by the workload analysis engine 208 and recommendation engine 214 as compared to a similar performance pattern of an application A1 executed on tenant X space 206.

In operation 604, the client recommendation engine 216 may receive client metadata 220. In general, client metadata. 220 may be any information about the use of tenant Y space 204 on the cloud environment, such as performance constraints, costs for reserving cloud resources, one or more service level agreements (SLAs) between a tenant operator and the cloud operator 202, one or more standards or limits of application deployment (such as security requirements, networking requirements, speed and other performance requirements, etc.), and the like. The client metadata 220 may determine which suggested recommendations received from the recommendation engine 214 are to be deployed or executed within the tenant space 204.

The client recommendation engine 216 may then generate one or more recommendation deployment instructions based on the received client metadata 220 and the recommendation from the recommendation engine 214, in operation 606. For example, the recommendation engine 214 may transfer a recommendation to tenant Y 204 to improve the execution of a networking workload by reducing the number of resources utilized to transmit network packets. However, the recommendation provided may not take into account certain security or reliability measurements for the packets. Rather, the recommendation may be based on a deployment of a similar application in tenant space X 206 which may not have the same security needs for networking packets as tenant space Y 204. In this example, the recommendation may suggest utilizing fewer resources that do not implement the desired security protocol on the packets in the deployment of the networking workload in tenant space Y 204. By analyzing the client metadata 220, the client recommendation engine 216 may determine that the received recommendation from the recommendation engine 214 would not meet the baseline requirements for networking applications of tenant Y 204.

In this particular example, therefore, the client recommendation engine 216 may determine that no re-deployments or adjustments to the deployed application should occur. In another instance, the client recommendation engine 216 may attempt to satisfy as many suggested recommendations while staying within the client metadata 220. This may include implementing some recommendations (or implementing partial recommendations) while disregarding other recommendations. In general, the client recommendation engine 216 for the particular tenant 204 analyzes the received recommendations and client metadata 220 and determines which deployment instructions should be issued for optimizing or improving the application or workload deployment on the tenant space 204.

In operation 608, the client recommendation engine 216 transmits the generated deployment instructions to a service engine 224 of the tenant space 204 for execution and deployment on the resources of the space. In one implementation, the client recommendation engine 216 utilizes one or more APIs to communicate with the service engine 224 for providing the instructions for execution. When received, the service engine 224 may execute some or all of the received recommendation instructions to improve the deployment of an application or workload on the tenant space 204. In this manner, recommendations for improving the performance a workload on a particular tenant space (or the cloud environment in general) may be received and implemented based on an analyzed performance of the same or similar application on another (or multiple other) tenant spaces of the cloud environment 102.

The same or similar system and method may be utilized to detect applications that consume disproportionate resources such that the performance of other applications that utilize the same resources may be affected. These applications may be referred to as "noisy neighbors". For example, two application of two different tenants 204, 206 may be deployed using the same resources, but their identifying performance pattern or signature is captured with different time intervals for execution. This may indicate a performance disadvantage/degradation for one of the applications. As both of the applications leverage the same set of resources, the cloud operator 202 may leverage this insight to detect noisy neighbors on resources. For example, one of the applications is running on a compute node with many other applications. While having access to the same amount of resources. It is performing worse than another application with the same set of resources (as determined through the performance pattern, correlation, and analysis of the applications discussed above). Having these insights allows the cloud operator 202 to investigate possible impact of other entities running on the same hosts and pro-actively suggest performance improvements when compute resource are moved to less utilized computes. This can be used for all resource types, networking, storage and compute. Also, the cloud operator 202 may be able to leverage this type of analysis to provide automated and dynamic performance improvements for applications run by tenants, Further, the systems and methods described herein may propose both static and dynamic recommendations. Static recommendations include those recommendations that do not take into account other parameters, such as client metadata 220 that may limit the deployment of a particular recommendation. Dynamic recommendations, on the other hand, allow the tenant (and more particularly, the client recommendation engine 216) the choice to accept a recommendation which upon acceptance may influence the choices offered to other tenants. In other words, the recommendation engine 214 may dynamically adjust the recommendation sets for a tenant based on the choices made by other tenants.

Further still, a client or user of the cloud environment 102 may be involved in the deployment of a recommendation in a tenant space. For example, the user may be provided with the different recommendations and determine the suggested recommendations improve (or potentially worsen) an applications performance. From this information, the user selects a recommended deployment template for deployment on the tenant space. In some embodiments, the recommendation engine 214, in the background, may assure a cloud operator is made aware of these recommendations and maintains a state of what recommendations tenants are using or deploying (that may then be fed back into the recommendation engine for future consideration when providing other recommendations).

Figure 7:
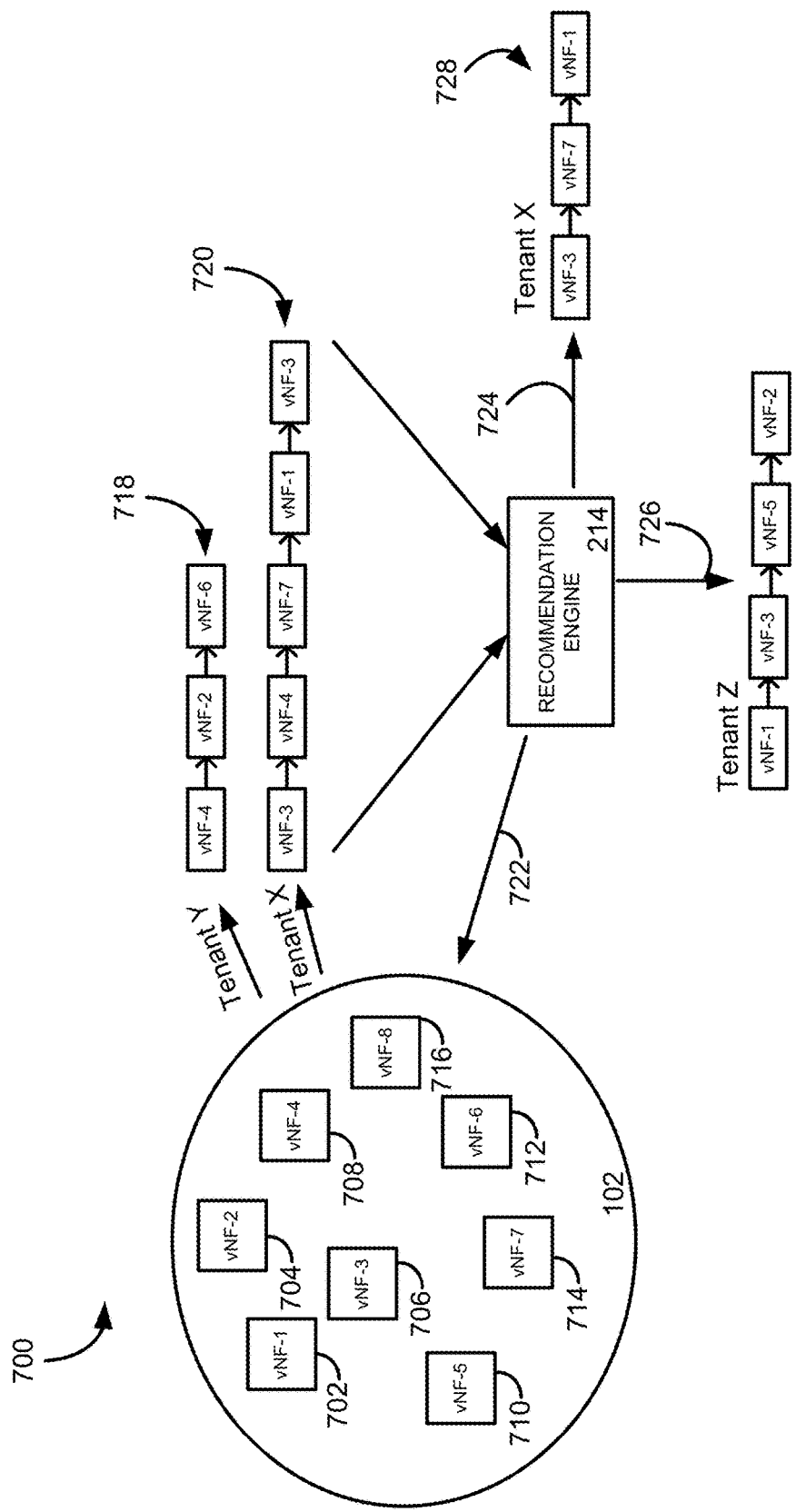
FIG. 7 is a diagram illustrating a system for correlating workload performance from multiple tenants on a computing network and providing deployment recommendations based at least on the correlated workload performance information.

Presented below is an example use case for the systems and methods described above. It should be appreciated that other implementations may also utilize the systems and methods for obtaining and correlating workload performance information from multiple tenants on a computing network and providing deployment recommendations based at least on the correlated workload performance information. FIG. 7, in particular, is a diagram 700 illustrating correlating workload performance from multiple tenants on a computing network and providing deployment recommendations to at least one tenant based on the correlated workload performance information. In general, a network functions virtualization infrastructure (NFVi) is created on the cloud environment 102 which includes multiple virtual network functions (vNFs). Although not discussed below, the vNFs may be executed or embodied on any number of devices and resources of the cloud environment 102 to perform any number of networking tasks.

As shown, cloud environment 102 may include eight such vNFs (702-716), although any number of vNEs may be created and included in the environment. Two tenants of the environment 102 (tenant Y and tenant X) may deploy workloads or applications on the environment to perform a similar networking activity. Tenant Y may utilize three vNFs of the environment 102, namely vNF-4 708, vNF-2 704, and vNF-6 712 as illustrated in function chain 718 in the diagram 700. To perform a similar networking function, tenant X may utilize five vNFs of the environment 102, namely vNF-3 706 (utilized twice), vNF-7 714, vNF-1 702, and vNF-3 706 as illustrated in function chain 720 in the diagram 700. The different function chains 718, 720 may be created in response to different tenant requirements or deployment operations for deploying applications and/or workloads on the environment 102.

As described above, the workload analysis engine 208 may receive performance metrics and logs from the devices or components of the function chains 718, 720. This information is utilized by the workload analysis engine 208 to identify a performance pattern of the function chains 718, 720 and determine similarities between the functions chains. In one implementation, the workload analysis engine 208 may determine that function chain 718 of tenant Y and function chain 720 of tenant X may be the same or a similar application or workload such that recommendations may be generated from an analysis of the function chains.

Once the two chains 718, 720 are identified as similar, several inputs, metrics, information, data, etc. concerning the functions chains may be provided to a recommendation engine 214. Such inputs may be gathered by monitoring the vNFs 702-716, hosts running the vNFs, a software-defined networking (SDN) environment managing the service function chaining (SFC), the network environment and any other relevant resources involved in hosting and operating the vNFs across multiple tenants. Such information may include, but is not limited to, CPU performance (CPU overcommit (yes/no), CPU features (like hyperthreading), CPU topology used (sockets, cores, threads), CPU Pinning (yes/nollCPU-core)), I/O performance (cache mode, I/O mode, I/O tuning), network performance (queue size, connectivity, hardware utilized, end-to-end jitter/latency/drops), memory performance, vNF structure (vNF ordering, vNF deployments, vNF chaining parameters, vNF types), and the like. These are but some examples of inputs provided to the recommendation engine to determine a performance of a function chain 718, 720 to generate one or more recommendations to a tenant of the environment 102.

Based on the information provided, the recommendation engine 214 calculates possible optimization recommendations for cloud environment 102 operators to enhance the backend, for current tenants to enhance their deployments and for new tenants to select optimized environments for deployment of an application or workload. In one implementation, the information provided above as input values may be captured for tenants and are correlated against, each other to improve the size of the possible recommendations.

For example, the CPU configuration provided to tenant Y and the network performance captured for vNFs running in the function chain 718 may be correlated so that the recommendation engine 214 is aware of the dependencies and can provide adequate optimization recommendations. In particular, the recommendation engine 214 may provide recommendations 722, to the cloud environment 102 to improve deployments of vNFs, recommendations 724 to tenant X to improve the deployment of the function chain 720 of tenant X, and recommendations 726 to other tenants (tenant Z to define service function chains for new applications or workloads. Each environment or tenant receiving the recommendations may or may not implement such recommendations based on an analysis of tenant or environment specific metadata or information. As shown in the diagram 700, tenant X may alter the function chain 720 or deployed networking application to utilize fewer vNFs and improve the performance of the application (as illustrated in function chain 728).

Although discussed above with relation to a networking application, similar approaches may be utilized by a cloud environment to provide recommendations of other applications or workloads. For example, a database workload may utilize the systems and methods, as well as use within an Internet of Things (IoT) environment. In general, any shared computing network may utilize the systems discussed herein to improve the deployment and operation of applications within the network.

Figure 8:
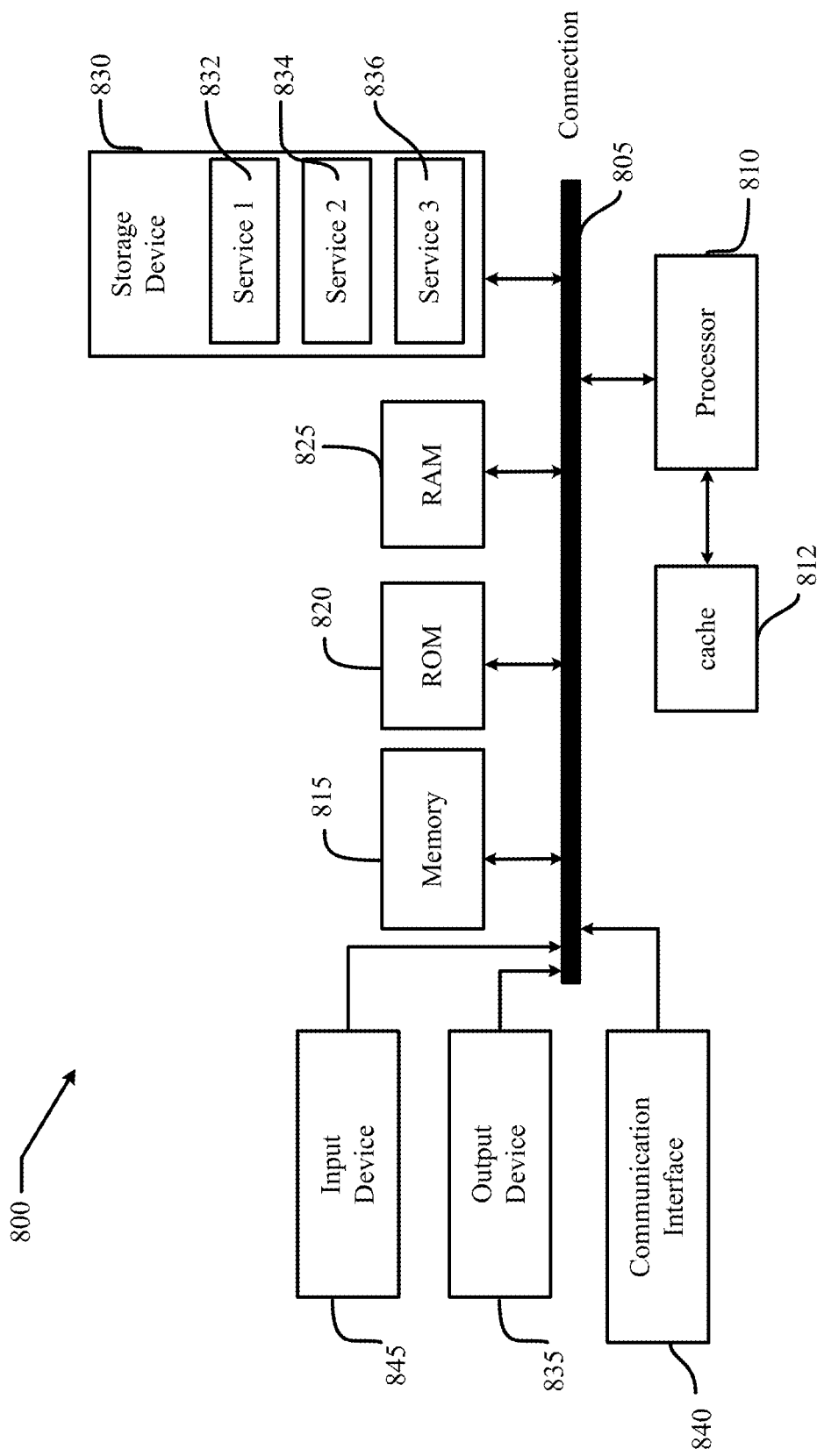
FIG. 8 shows an example system embodiment.

FIG. 8 shows an example of computing system 800 in which the components of the system are in communication with each other using connection 805. Connection 805 can be a physical connection via a bus, or a direct connection into processor 810, such as in a chipset architecture. Connection 805 can also be a virtual connection, networked connection, or logical connection.

In some embodiments, computing system 800 is a distributed system in which the functions described in this disclosure can be distributed within a datacenter, multiple datacenters, a peer network, etc. In some embodiments, one or more of the described system components represents many such components, each performing some or all of the function for which the component is described. In some embodiments, the components can be physical or virtual devices.

Example system 800 includes at least one processing unit (CPU or processor) 810 and connection 805 that couples various system components, including system memory 815, such as read only memory (ROM) 820 and random access memory (RAM) 825, to processor 810. Computing system 800 can include a cache of high-speed memory connected directly with, in close proximity to, or integrated as part of processor 810.

Processor 810 can include any general purpose processor and a hardware service or software service, such as services 832, 834, and 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction, computing system 800 includes an input, device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms known to those of skill in the art. In some instances, multimodal systems can enable a user to provide multiple types of input/output to communicate with computing system 800. Computing system 800 can include communications interface 840, which can generally govern and manage the user input and system output. There is no restriction on operating on any particular hardware arrangement and therefore the basic features here may easily be substituted for improved hardware or firmware arrangements as they are developed.

Storage device 830 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 830 can include software services, servers, services, etc., that when the code that defines such software is executed by the processor 810, it causes the system to perform a function. In some embodiments, a hardware, service that performs a particular function can include the software component stored in a computer-readable medium in connection with the necessary hardware components, such as processor 810 connection 805, output device 835, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be preformed or implemented by a combination of hardware and software services or services, alone or in combination with other devices. In some embodiments, a service can be software that resides in memory of a portable device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method for deployment of a workload on a computing environment, the method comprising:

receiving a first set of log entries from a first tenant space on a computing environment generated from a first executed workload on the computing environment;

creating a performance pattern from the first set of log entries corresponding to the first executed workload;

identifying the performance pattern corresponding to a second executed workload deployed on the computing environment on a second tenant space of the computing environment;

correlating a performance metric with the first executed workload and the second executed workload;

generating at least one deployment recommendation for a deployment of the second executed workload deployed on the computing environment by the second tenant space of the computing environment, the at least one deployment recommendation based at least on the correlated performance metric of the first executed workload; and transmitting the at least one deployment recommendation to the second tenant space of the computing environment.

2. The method of claim 1 further comprising:

receiving a first set of performance metrics from the first tenant space on the computing environment generated from the first executed workload on the computing environment, wherein creating the performance pattern is further based on the received first set of performance metrics.

3. The method of claim 1 further comprising:
receiving deployment information from the first tenant space on the computing environment for the deployment of the first executed workload, the deployment information comprising a first set of resources of the computing environment utilized by the first executed workload.

4. The method of claim 3 further comprising:
receiving deployment information from the second tenant space on the computing environment for the deployment of the second executed workload, the deployment information comprising a second set of resources of the computing environment utilized by the second executed workload.

5. The method of claim 4 wherein the generating at least one deployment recommendation for the deployment of the second executed workload is further based on the first set of resources of the computing environment and the second set of resources of the computing environment.

6. The method of claim 1 further comprising:
obtaining metadata of the second tenant space of the computing environment, the metadata comprising one or more constraints on deployment of workloads on the second tenant space of the computing environment.

7. The method of claim 6 wherein the metadata of the second tenant space comprises a service level agreement between a second tenant operator and a computing environment operator.

8. The method of claim 6 further comprising:
executing the at least one deployment recommendation on the second tenant space of the computing environment, wherein executing the at least one deployment recommendation alters the deployment of the second executed workload in the second tenant space.

9. The method of claim 8 wherein executing the at least one deployment recommendation is based at least on the metadata of the second tenant space of the computing environment.

10. A computing environment management device comprising:
a processing device; and
a computer-readable medium connected to the processing device configured to store information and instructions that, when executed by the processing device, performs the operations of:
receiving a first set of log entries from a first tenant space on a computing environment generated from a first executed workload on the computing environment;
creating a performance pattern from the first set of log entries corresponding to the first executed workload;
identifying the performance pattern corresponding to a second executed workload deployed on the computing environment on a second tenant space of the computing environment;
correlating a performance metric with the first executed workload and the second executed workload;
generating at least one deployment recommendation for a deployment of the second executed workload deployed on the computing environment by the second tenant space of the computing environment, the at least one deployment recommendation based at least on the correlated performance metric of the first executed workload; and
transmitting the at least one deployment recommendation to the second tenant space of the computing environment.

11. A system for deployment of a workload on a computing environment, the system comprising:
a non-transitory computer readable memory storing instructions;
a processor programmed to cooperate with the instructions to perform operations comprising:
receiving a first set of log entries from a first tenant space on a computing environment generated from a first executed workload on the computing environment;
creating a performance pattern from the first set of log entries corresponding to the first executed workload;
identifying the performance pattern corresponding to a second executed workload deployed on the computing environment on a second tenant space of the computing environment;
correlating a performance metric with the first executed workload and the second executed workload;
generating at least one deployment recommendation for a deployment of the second executed workload deployed on the computing environment by the second tenant space of the computing environment, the at least one deployment recommendation based at least on the correlated performance metric of the first executed workload; and
transmitting the at least one deployment recommendation to the second tenant space of the computing environment.

12. The system of claim 11, the operations further comprising:
receiving a first set of performance metrics from the first tenant space on the computing environment generated from the first executed workload on the computing environment, wherein creating the performance pattern is further based on the received first set of performance metrics.

13. The system of claim 11, the operations further comprising:
receiving deployment information from the first tenant space on the computing environment for the deployment of the first executed workload, the deployment information comprising a first set of resources of the computing environment utilized by the first executed workload.

14. The system of claim 13, the operations further comprising:
receiving deployment information from the second tenant space on the computing environment for the deployment of the second executed workload, the deployment information comprising a second set of resources of the computing environment utilized by the second executed workload.

15. The system of claim 14 wherein the generating at least one deployment recommendation for the deployment of the second executed workload is further based on the first set of resources of the computing environment and the second set of resources of the computing environment.

16. The system of claim 11, the operations further comprising:
obtaining metadata of the second tenant space of the computing environment, the metadata comprising one or more constraints on deployment of workloads on the second tenant space of the computing environment.

17. The system of claim 16 wherein the metadata of the second tenant space comprises a service level agreement between a second tenant operator and a computing environment operator.

18. The system of claim 16, the operations further comprising:
   executing the at least one deployment recommendation on the second tenant space of the computing environment, wherein executing the at least one deployment recommendation alters the deployment of the second executed workload in the second tenant space.

19. The system of claim 18 wherein executing the at least one deployment recommendation is based at least on the metadata of the second tenant space of the computing environment.

* * * * *